Patented Apr. 17, 1928.

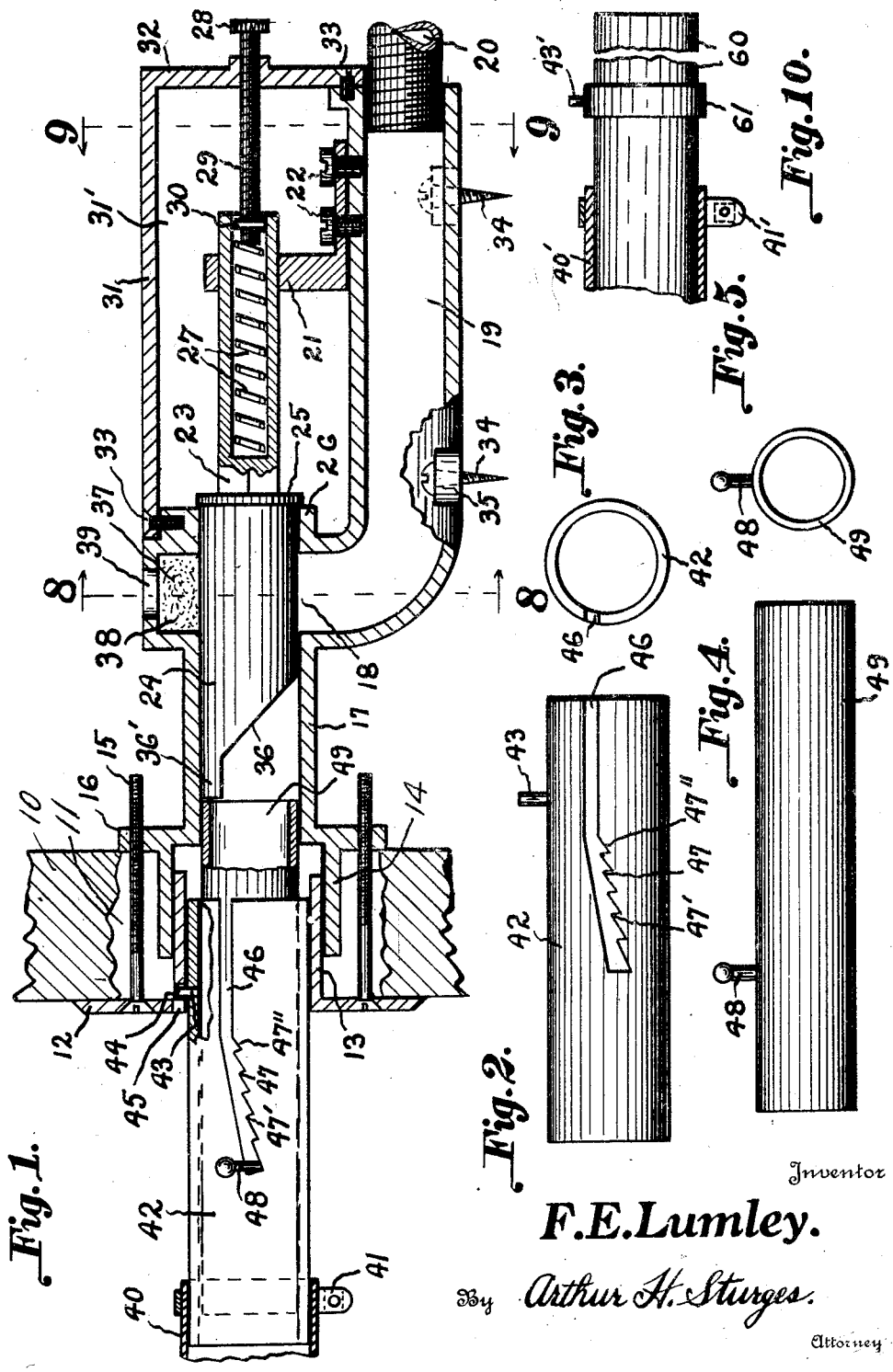

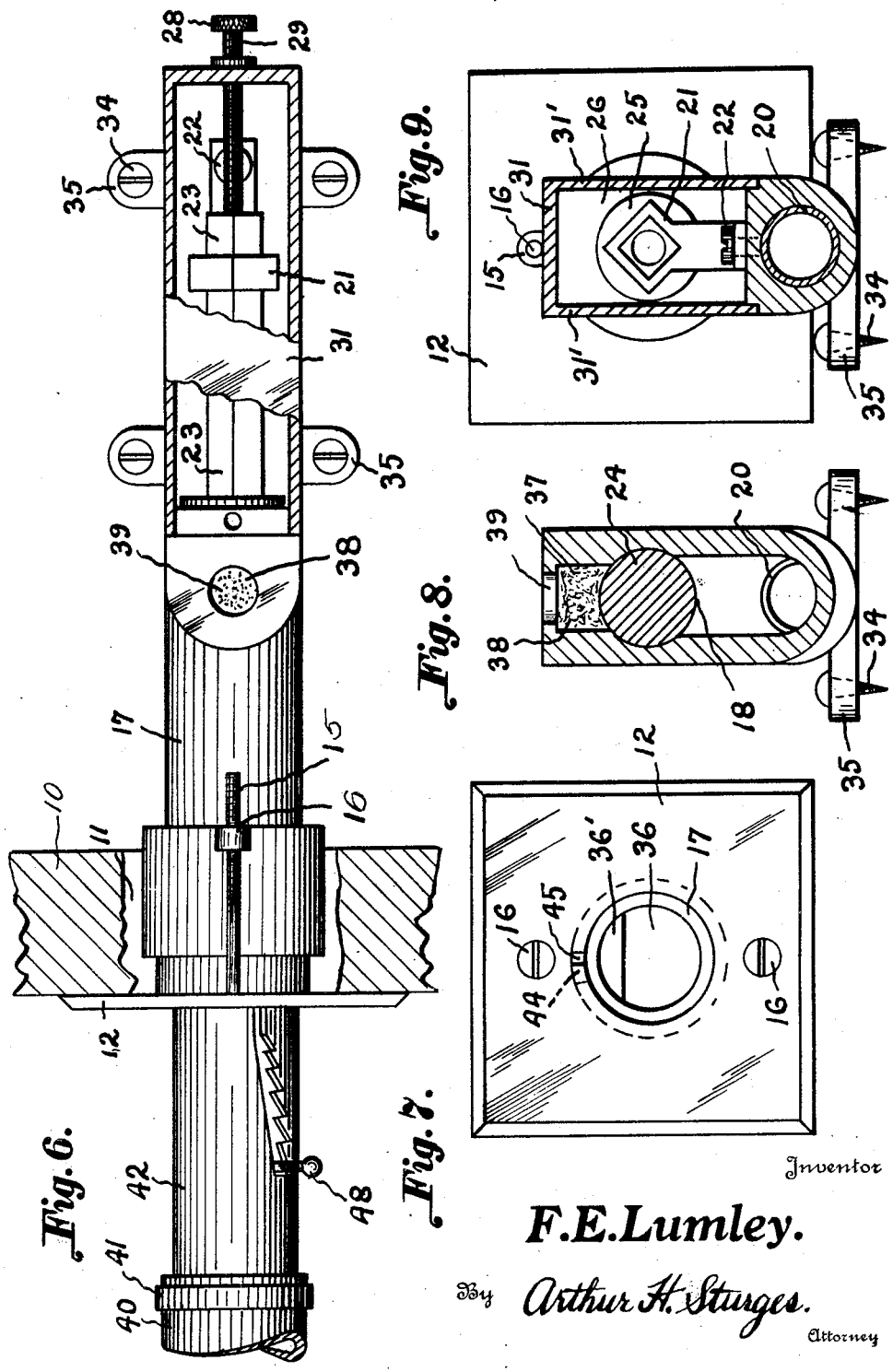

1,666,629

UNITED STATES PATENT OFFICE.

FRANK E. LUMLEY, OF OMAHA, NEBRASKA.

VALVE.

Application filed August 31, 1925. Serial No. 53,560.

The present invention relates to improvements in valves and more particularly refers to a wall installation for use in connection of vacuum cleaning systems.

An object of the invention is to provide a wall socket structure in connection with a source of vacuum for the attachment of a hose connection in much the same fashion as electric light sockets are now provided as wall fixtures.

Another object of the invention is to provide an improved construction in which the socket is adapted for adjustment to accommodating walls of varying thickness.

A further object of the invention is to provide an improved wall socket and combined valve structure, whereby the valve will be obscured in the wall, but will be rendered readily operable by the connection from the exterior of the wall, and whereby the operator may govern the amount of air passing through the valve to the hose connection.

It is a still further object of the invention to so construct and arrange the parts that the attachment may be made to the wall socket without entailing any leakage of air.

Other objects are to provide an inexpensive and simply constructed wall plug and valve installation with few and simple parts that may be mounted as a unit.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal section through a device constructed according to the invention, and shown as in place in a wall.

Figure 2 is a side view of the affixing barrel.

Figure 3 is an end view thereof.

Figure 4 is a side view of the adjusting barrel.

Figure 5 is an end view of the same.

Figure 6 is a top plan view, with parts broken away, of the assembled device.

Figure 7 is an elevation of the wall plate with the attachment removed.

Figure 8 is a cross section taken on the line 8—8 in Figure 1.

Figure 9 is a similar section taken on the line 9—9 also in Figure 1, and

Figure 10 is a detail view showing a modification.

Referring more particularly to the drawings, 10 designates the wall of an apartment or other building through which an opening 11 is made to receive the installation.

At 12 is indicated the flush plate or the wall plate having the sleeve 13 extending inwardly from a central opening of the plate 12. The sleeve 13 telescopes into a companion sleeve 14 carried by the valve casing 17 which is cylindrical. Perforated threaded lugs 16 extend outwardly from the sleeve 14 to receive the threaded bolts 15, which extend through the flush plate. The sleeves are held together and the valve coupled to a flush plate in this manner. Such connection permits of adjustment for walls of varying thickness.

This valve casing 17 forms an extension of the pipe 19, which has the elbow and the upwardly extending forward portion providing the port 18 normally closed by the cylindrical valve body 24 adapted to reciprocate horizontally. The pipe 19 connects with a pipe line 20 in communication with a source of vacuum or suction. This source is generally located in the basement of the building. The pipe 19 may be provided with the lugs 35 to seat upon a support and to receive the screws 34 for holding the installation on such support. The upper end of the elbow above the valve body 24 is provided with a space 37 to receive the packing 38, the packing being introduced through the opening 39 at the top. Oil may also be introduced through this opening to saturate the packing and to lubricate the valve body 24. The forward edge 26 of the valve body is inclined and a pilot tip 36 is formed on the upper outer inclined end for the purpose of engaging the actuating barrel 49 as hereinafter explained. This pilot and the inclined end of the valve body provide an extensive bearing surface and prevent the valve from dropping down into the port 18.

The rear end of the valve body 24 is provided with the enlarged flanged 25 to take against the shoulder 26 formed on the pipe 19, whereby to prevent the further movement of the valve toward the wall.

The valve body carries a hollow or square stem 23 fitted in a correspondingly shaped bearing 21. This bearing is affixed as by the screws 22 to the upper side of the pipe 19. A coil spring 27 within the hollow stem urges the valve to the closed position, shown in Figure 1. The tension of the spring may be adjusted by the screw rod 29, which projects through a rear wall 32 of the housing 31, which is affixed to appropriate parts of the pipe 19 by the screws or other fastening means 33. The outer end of the screw shaft 29 is provided with the knurled operated button 28 and the shaft has threaded engagement with the wall 32. The inner end of the threaded shaft is provided with a washer or head 30, which takes against the adjacent end of the spring 27. This washer or head also has threaded engagement with the shaft and may be independently adjusted there along to further vary the tension of the spring. The tension of the spring is roughly regulated by the adjustment of the washer 30 and a nicer adjustment is secured by the rotation of the rod 29.

The opening in the flush plate 12 and the sleeve 13 are adapted to removably receive the attaching or affixed barrel 42 and to hold the barrel in place, a pin 43 is made thereon and arranged to enter an opening 45 in the flush plate adjoining the central opening. The opening 45 connects at its inner edge with a circumferential opening 44. The pin 43 is inserted through the opening 45 until it reaches the opening 44 and it is then turned (compare Figures 1 and 7). The arrangement is much like a bayonet joint.

The barrel 42 is provided with the slot 46 opening through its inner end and connecting with an inclined portion having a series of teeth 47 to engage with a pin 48 projecting radially from an inner valve actuating cylinder 49. This last mentioned cylinder 49 is fitted rotatably within the affixed cylinder 42 and the inner end of the cylinder 49 is adapted to lie adjacent and to strike the pilot 36' of the valve.

The outer end of the affixed cylinder 42 receives the hose 40 held thereon by the hose clamp 41. To the hose is connected any sort of receiving implement or nozzle to be moved over the carpet, fabric or other material to be cleaned.

The adjusting apparatus is housed by the casing 31 having the side walls 31' extending down to the upper end of the pipe 19. The cover is open at the bottom and at one end to accommodate the pipe 19 and its elbow.

In the use of the device the wall and the flush plate present the appearance indicated in Figure 7 and the valve 24 within is closed, so that there is no communication of the room atmosphere with the suction apparatus. The hose connection may be kept in the closet or other place and produced when their use is needed, the attachment being made by thrusting the cylinders 42 and 49 in their nested state into the opening in the flush plate and engaging the pin 43 with the angular slot in the flush plate and sleeve 13. The handle or button 48 may then be moved inwardly, the inner end of the sleeve 49 engaging with the pilot of the valve and thrusting the valve rearwardly to open the port 18 to a desired degree. If the operator desires to clean clothes of soft material, a large amount of suction through the hose 40 is not desirable as it will usually suck the nap off the cloth and wear it out more rapidly. For soft material, clothes etc., the operator advances the arm 48 toward the wall for a slight distance only and engages the arm with say the tooth 47'. A slight port area will be exposed and there will be a comparatively small inrush of air through the "pick-up" tool at the end of the hose 40. However, for cleaning carpets and the like, where heavy dust or mud is encountered the valve port 18 may be fully opened by advancing the arm to the notch 47".

In Figure 10 is shown a modification of the hose connection provided with a locking pin 43' adapted to fit in the slot 45 of the flush plate. The hose 40' and the clamp 41' are similar to parts already described. The barrel 60 in this case is directly coupled to the hose and fits in the valve casing 17 and against the valve. The shim ring 61 may be used as a filler so that the connection will snugly fit the diameter of the sleeve 13. In the use of this connection no adjustment of the amount of air entering the valve is possible, other than to open the valve. This connection is useful for certain general purposes where no fine adjustment is required.

I do not wish to be restricted to the size, form, and proportions of the various parts, and obviously changes could be made in the construction herein described without departing from the spirit of the invention, it being only necessary that such changes fall within the scope of the appended claims:—

What is claimed is:—

1. A vacuum installation for walls comprising a flush plate having a sleeve extending into the wall, a valve casing behind said plate and adjustably connected therewith, said valve casing being in connection with a source of suction, a valve in the casing, adjustable means to yieldably hold the valve closed, a hose attachment to the plate and sleeve, and a slidable barrel carried with the attachment and operable from outside the plate and engaging the valve to open the same.

2. A vacuum installation for walls comprising a flush plate having a sleeve, a valve casing joining with the sleeve and connecting with a source of suction, a valve in the casing, means to yieldably close the valve, a barrel fitted through the plate and sleeve, and a second barrel slidable with respect to the first barrel for engaging and opening the valve.

3. A vacuum installation for walls comprising a flush plate having a sleeve, a valve casing joining with the sleeve and connecting with a source of suction, a valve in the casing, means to yieldably close the valve, a barrel fitted through the plate and sleeve, a second barrel slidable with respect to the first barrel for engaging and opening the valve, and means on the exterior of said plate for adjusting said second barrel and holding same in adjusted position.

4. A vacuum installation for walls comprising a flush plate having a sleeve, a valve casing joining with the sleeve and connecting with a source of suction, a valve in the casing, means to yieldably close the valve, a barrel fitted through the plate and sleeve, a second barrel slidable with respect to the first barrel for engaging and opening the valve, said first barrel having a slot therein with a toothed edge, and an operating member on the second barrel projecting through said slot and engageable with said toothed edge.

5. A vacuum installation for walls comprising a flush plate having a sleeve extending into the wall, a valve casing having a sleeve telescoping with said first sleeve and being in connection with a source of vacuum, means to adjustably attach said casing to said flush plate, a valve in the casing, means to yieldably close the valve, interfitting barrels detachably engaging through said plate and sleeves, a hose affixed to one of said barrels, the inner barrel being slidable and engaging said valve, and operating means on the inner barrel projecting through the other barrel.

6. A vacuum installation for buildings comprising supporting means through the building element, a valve casing behind the supporting means in connection with a source of vacuum, a valve in the casing, means to urge the valve to a closed position, means to adjust the tension of said last-named means, and a hose attachment for detachably engaging said supporting means having means to open said valve.

7. A vacuum installation for buildings comprising supporting means mounted through an element of the building, a valve casing behind said means, a valve in the casing having stop means, a hollow stem for the valve, an adjustable shaft entering said hollow shaft having an adjustable head thereon resilient means in the stem engaging said head to move the valve against said stop means, and a hose attachment engaging detachably with said supporting means and acting to open the valve.

8. A vacuum installation for buildings comprising supporting means extending into an element of the building, a valve casing behind said supporting means, a suction pipe having an elbow connecting with said casing, a valve in the casing and elbow, adjustable yieldable means to close the valve across said elbow, lubricating means in the elbow above the valve, and a hose attachment removably engaging with said supporting means and acting to open the valve.

In testimony whereof I have affixed my signature.

FRANK E. LUMLEY.